(12) United States Patent
Zheng

(10) Patent No.: US 8,799,860 B2
(45) Date of Patent: Aug. 5, 2014

(54) SYSTEM AND METHOD FOR EXPRESSING XML SCHEMA VALIDATION USING JAVA IN A DECLARATIVE MANNER

(75) Inventor: Wei Zheng, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1488 days.

(21) Appl. No.: 11/957,388

(22) Filed: Dec. 14, 2007

(65) Prior Publication Data

US 2009/0157725 A1 Jun. 18, 2009

(51) Int. Cl.
G06F 9/44 (2006.01)

(52) U.S. Cl.
USPC .......................................... 717/124; 715/237

(58) Field of Classification Search
None
See application file for complete search history.

(56) References Cited

U.S. PATENT DOCUMENTS

| | | | |
|---|---|---|---|
| 6,950,985 B2 | 9/2005 | Lee | |
| 7,130,862 B2 | 10/2006 | Easton | |
| 7,747,945 B1 * | 6/2010 | Babka et al. ................. | 715/237 |
| 2005/0038816 A1 * | 2/2005 | Easton ....................... | 707/104.1 |
| 2005/0138135 A1 * | 6/2005 | Kundu et al. ................. | 709/217 |
| 2005/0262115 A1 * | 11/2005 | Hu et al. ...................... | 707/100 |
| 2006/0085451 A1 * | 4/2006 | Pal et al. ...................... | 707/100 |
| 2007/0240104 A1 * | 10/2007 | Martinez et al. .............. | 717/104 |

OTHER PUBLICATIONS

"Advanced XML Validation", Peter Heneback, Dec. 9, 2007, http://www-128.ibm.com/developerworks/xml/library/x-crsfldvalid.
"Extending XML Schemas", Dec. 9, 2007, http://www.xfront.com/ExtendingSchemas.html.

* cited by examiner

Primary Examiner — Li B Zhen
Assistant Examiner — Lenin Paulino
(74) Attorney, Agent, or Firm — Cantor Colburn LLP; Terry Carroll

(57) ABSTRACT

A system and method for expressing XML schema validation using Java in a declarative manner is disclosed. In one embodiment of the present invention a method for processing information comprises defining a schema validation using metadata stored in a database and building a memory model using the metadata. Input data for validation is received in a validation engine, which validates the input data by executing a Java program in the validation engine using the input data and the metadata. An output is generated from the validation engine that identifies the input data as being validated or not validated.

12 Claims, 11 Drawing Sheets

| ValidatorCommon |
|---|
| ValidatorCommon()
getEngine()
getErrorCode()
getErrorMessage()
setRuleId(String)
getRuleId()
getNextValidator()
setEngine(Validator)
setErrorCode(String)
setErrorMessage(String)
setNextValidator(Validator)
setParameter(Map)
toString()
validate(Object)
validate(Object, DWLStatus)
validate(Object, DWLStatus, Object)
validate(Object, Object) |

*FIG. 3*

```
<xsd:schema xmlns:product="http://www.ibm.com/xmlns/prod/websphere/mdm/product/
schema" xmlns:xsd="http://www.w3.org/2001/XMLSchema" targetNamespace="http://www.ibm.com/
xmlns/prod/websphere/mdm/product/schema">
    <xsd:complexType name="ProductPrice">
        <xsd:sequence>
            <xsd:element name="normal" type="xsd:decimal"/>
            <xsd:element name="discount" type="xsd:decimal" minOccurs="0"/>
        </xsd:sequence>
    </xsd:element>
    <xsd:element name="Product">
        <xsd:complexType>
            <xsd:sequence>
                <xsd:element name="GTIN" type="xsd:integer"/>
                <xsd:element name="description" type="xsd:string" minOccurs="0"/>
                <xsd:element name="Price" type="product:ProductPrice"/>
            </xsd:sequence>
        </xsd:complexType>
    </xsd:element>
</xsd:schema>
```

*FIG. 5*

```
<Product>
    <GTIN>1853729163851</GTIN>
    <description>Example</description>
    <Price>
        <normal>188.00</normal>
        <discount>94.00</discount>
    </Price>
</Product>
```

*FIG. 6*

| A GTIN validation definition |
|---|
| Validation Target:    TARGET_ID:    12345<br>(Assuming this ID will link to a schema defined ) |
| Validation Context:    APPLICATION:    MDM<br>                             TRANSACTION_TYPE:    CREATE<br>(Task definition will be invoked when a create action happened) |
| Validation Function:    JAVA_CLASS:    com.ibm.mdm.validation.GTINCheck<br>(GTIN validation check logic will be implemented in this class) |
| Validation Condition:    Optional, we will not use it here |
| Validation Parameters:    PARAM_TYPE:    PATH<br>                                PARAM:    /Product/GTIN<br>(This parameter driven validation function com.ibm.mdm.validation.GTINCheck is reusable if more than one schema has GTIN attribute. It is realized by specifying different PATH to GTIN element in the schema) |

*FIG. 7*

V_VAL

| VAL_CODE | TRGT_ID | PRTY | APPL | TRANS_TYPE | ERR_CODE | EFF_DT | FNC_NAME | EXP_DT | LAST_UPDATE_DT |
|---|---|---|---|---|---|---|---|---|---|
| 38001 | 12345 | | MDM | CREATE | 1001 | | GTINCheck | | Sep 17, 2007 3:00PM |

V_PARAM

| VAL_CODE | PARAM_TYPE | PARAM_VALUE | DESCRIPTION | EXP_DT | LAST_UPDATE_DT |
|---|---|---|---|---|---|
| 38001 | PATH | /Product/GTIN | Path to GTIN attribute | | Sep 17, 2007 3:00PM |

V_TRANSACTION

| TRANS_TYPE | APPL | TRANSACTION_DESC | EXP_DT | LAST_UPDATE_DT |
|---|---|---|---|---|
| CREATE | MDM | Master Data Management | | Sep 17, 2007 3:00PM |

V_FUNCTION

| FUNC_NAME | JAVA_CLASS | RULE_FUNC | JS_FUNC | XLS_FUNC | DB_FUNC | EXP_DT | LAST_UPDATE_DT |
|---|---|---|---|---|---|---|---|
| GTINCheck | com.ibm.mdm.validation.GTINCheck | | | | | | Sep 17, 2007 3:00PM |

*FIG. 8*

| | |
|---|---|
| A price validation definition | |
| Validation Target: TARGET_ID: (Assuming this ID will link to a schema defined ) | 12345 |
| Validation Context: APPLICATION: TRANSACTION_TYPE: (Task definition will be invoked when a create action happened) | MDM CREATE |
| Validation Function: JAVA_CLASS: (Greater check will be implemented in this class) | com.ibm.mdm.validation.GreaterCheck |
| Validation Condition: | Optional, we will not use it here |
| Validation Parameters: PARAM_TYPE: PARAM: PARAM_TYPE: PARAM: | BIG /Product/Price/normal SMALL /Product/Price/discount |

*FIG. 9*

V_VAL

| VAL_CODE | TRGT_ID | PRTY | APPL | TRANS_TYPE | ERR_CODE | EFF_DT | FNC_NAME | EXP_DT | LAST_UPDATE_DT |
|---|---|---|---|---|---|---|---|---|---|
| 38002 | 12345 | | MDM | CREATE | 10002 | | GreaterThan | | Sep 17, 2007 3:00PM |

V_PARAM

| VAL_CODE | PARAM_TYPE | PARAM_VALUE | DESCRIPTION | EXP_DT | LAST_UPDATE_DT |
|---|---|---|---|---|---|
| 38002 | BIG | /Product/Price/normal | Path to GTIN attribute | | Sep 17, 2007 3:00PM |
| 38001 | SMALL | /Product/Price/disco | Path to GTIN attribute | | Sep 17, 2007 3:00PM |

V_TRANSACTION

| TRANS_TYPE | APPL | TRANSACTION_DESC | EXP_DT | LAST_UPDATE_DT |
|---|---|---|---|---|
| CREATE | MDM | Master Data Management | | Sep 17, 2007 3:00PM |

V_FUNCTION

| FUNC_NAME | JAVA_CLASS | RULE_FUNC | JS_FUNC | XLS_FUNC | DB_FUNC | EXP_DT | LAST_UPDATE_DT |
|---|---|---|---|---|---|---|---|
| GTINCheck | com.ibm.mdm.validation.GreaterCheck | | | | | | Sep 17, 2007 3:00PM |

*FIG. 10*

SYSTEM AND METHOD FOR EXPRESSING XML SCHEMA VALIDATION USING JAVA IN A DECLARATIVE MANNER

FIELD OF INVENTION

The present invention generally relates to computer implemented information management systems, and particularly to systems and methods for expressing complex constrains for XML schema.

BACKGROUND

Extensible Markup Language (XML) was first designed as a complete, platform-independent and system-independent environment for delivering and authoring of information resources over the World Wide Web (hereinafter, "Web"). XML was intended to supplement and in some cases replace Hypertext Markup Language (HTML), which had been the prevalent method of authoring and referencing content over the Web.

XML is a set of technologies that define a universal data format for tree-based, hierarchically-formed information. A number of specifications extending its range and power, such as Extensible Stylesheet Language (XSL), Document Object Model (DOM), and XSL Transformations (XSLT), are being developed. XML offers the advantages of platform independence and Web awareness, and many XML tools are open source and freely available. Thus, XML technologies can provide a simple and low cost solution for enterprise-wide access to information.

Because XML is used to describe information as well as structure, it is particularly well suited as a data description language. One of XML's particular strengths is that it allows entire industries, academic disciplines, and professional organizations to standardize the representation of information within those disciplines. In particular, communicating parties need to agree on an XML dialect for their particular business domain and needs. This dialect is usually defined in a Document Type Definition (DTD) or XML Schema document, which defines the syntax and data types to which all of its instance XML documents must conform. The data source will generate XML data according to their DTD or Schema definition. The data consumer system can use an XML validating parser to verify the syntax of the incoming data before passing it to its data processing system.

While syntax validation is important in preventing erroneous data from disrupting the data consumer system, it cannot verify the equally important non-structural semantic constraints on XML data. In reality, the value or presence of an element may depend on the value or presence of another element; and the value scope of an element may vary for different document instances and be decided by system environment. A grammatically validated XML document does not guarantee itself to be meaningful. Even though XML Schema is much more powerful than DTD, it cannot be used to specify non-structural constraints. There is a need for an extensible, expressive, platform-neutral, and domain-independent way of specifying semantic constraints on XML documents.

Another challenge for data integration is the specification of complex constraints on business data models. While in theory a text editor can be used to specify such constraints in a particular constraint specification language, the complexities of real-world business data structures could make such constraint specifications cryptic and error-prone. Ideally, such constraints could be specified at a more abstract data model level so the human users can visually help verify the constraints.

Another challenge relates to constraint validation. XML validating parsers cannot use the constraint documents to validate non-structural constraints. Hard coding such constraints into a program is not attractive, since such a program may not truthfully implement the constraints, is not flexible for system modifications or extensions, and cannot be reused. Mature XML technologies should be used to provide a generic framework for automatic constraint validation.

To address these limitations, extensions to XML Schema have been developed to express complex constraints for validation. There are at least three options for extending XML schema limitation to express complex constraints. The first option uses additional schema languages. Drawbacks with this approach include the fact that it does not solve all the complex constraint cases, some of which can only be expressed with difficulty by a schema language. Also, each schema language has its own capabilities and limitations, so multiple schema languages may be required to express all the additional constraints. Further, there is the burden on users who must learn each of the additional schema languages. Finally, there is uncertainty about long term support for the schema languages, particularly if they were created by a single author, who may not be counted on for continuing support.

A second option is using XSLT/XPath stylesheet to express additional constraints. One drawback with this option is that it does not solve all the complex constraint cases, some of which can only be expressed with difficulty by XSLT/XPath stylesheet. Also, performance may be an issue with multiple constraints in XSLT/XPath stylesheet.

A third option is using a programming language (Java, C++) to express additional constraints. Problems with this option arise because this is a tightly coupled programming model and may be difficult to change at deployment time and runtime. Also, with this option, the constraints cannot be expressed in a declarative manner.

Accordingly, there is a need for systems and methods that can express complex constraints for XML schema. Also, there is a need for a solution to the above-discussed problems that utilizes with the full power of a programming language and which also has the capability to express complex constraints in a declarative manner.

SUMMARY OF THE INVENTION

To overcome the limitations in the prior art briefly described above, the present invention provides a method, computer program product, and system for expressing complex constraints for XML schema.

In one embodiment of the present invention, a method for processing information comprises: defining a schema validation using metadata stored in a database; building a memory model using the metadata; receiving input data for validation in a validation engine; validating the input data by executing a Java program in the validation engine using the input data and the metadata; and generating an output from the validation engine that identifies the input data as being validated or not validated.

In another embodiment of the present invention, a method for validating XML schema comprises: expressing a set of complex constraints as declarative metadata; storing the declarative metadata in database tables; creating a runtime memory model using the declarative metadata; and validating the XML schema using the declarative metadata in a Java validation engine.

In an additional embodiment of the present invention, a system for performing schema validation comprises: a validation engine running a Java program; a metadata structure including database tables defining a set of complex constraints for the schema, the metadata structure being coupled to the validation engine; and input data receiving component coupled to the validation engine, wherein the validation engine uses the complex constraints in the metadata structure to validate the input data.

In another embodiment of the present invention, a computer program product comprises a computer usable medium having a computer readable program, wherein the computer readable program when executed on a computer causes the computer to: define a schema validation using metadata stored in a database; build a memory model using the metadata; receive input data for validation in a validation engine; validate the input data by executing a Java program in the validation engine using the input data and the metadata; and generate an output from the validation engine that identifies the input data as being validated or not validated.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there are described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 3 shows a diagram of the Java class ValidatorCommon used with an embodiment of the present invention;

FIG. 5 shows an XML Schema Definition (XSD) used to illustrate an embodiment of the present invention;

FIG. 6 shows an XML instance fragment for the XSD schema shown in FIG. 5 used to illustrate an embodiment of the present invention;

FIG. 7 shows an XML validation metadata used to illustrate an embodiment of the present invention;

FIG. 8 shows a metadata table records related to the metadata shown in FIG. 7 used to illustrate an embodiment of the present invention;

FIG. 9 shows a price validation definition used to illustrate an embodiment of the present invention;

FIG. 10 shows metadata table records for the price validation definition shown in FIG. 5 used to illustrate an embodiment of the present invention.

DETAILED DESCRIPTION OF THE INVENTION

The present invention overcomes the problems associated with the prior art by teaching a system, computer program product, and method for declaratively expressing complex constraints for XML schema using Java language. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The invention addresses problems with complex constraints for XML schema validation. The present invention introduces a method which declaratively defines a schema validation using metadata stored in database tables. The metadata can be changed at deployment time or at runtime. The metadata points to a Java class to process any complex logic of validation function with the full programming power of Java. The metadata also contains parameters for the Java function. This Java function can de-coupled from a specific schema and reused for multiple schema. At runtime this metadata is consumed by the application to build up a memory model to support the execution of validation. The result is a solution that has the advantages of both the declarative approach and the full programming power from Java.

Prior solutions either used additional schema languages, used XSLT/XPath stylesheets, or a programming language to express additional constraints. In contrast, the present invention defines a schema validation declaratively using metadata stored in database tables. The present invention is a flexible solution which can be extended to include any rule or Java call to do a validation. Another advantage is that the validation logic can be updated in a database by a business user and does not require a programmer to update.

Figure 1:
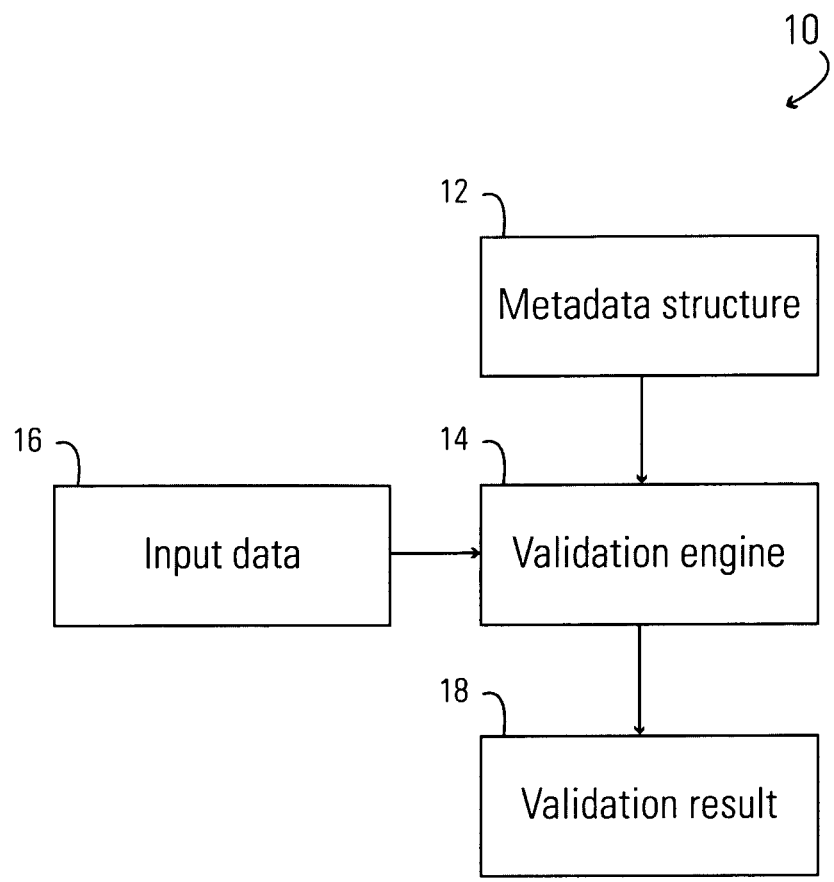
FIG. 1 shows block diagram of a system for expressing XML schema validation in accordance with an embodiment of the present invention.

FIG. 1 shows a block diagram of a system 10 for expressing XML schema validation in accordance with an embodiment of the present invention. A set of database tables defining a metadata structure 12 is constructed as described in more detail below. A validation engine 14 is a runtime validation engine written in Java, which executes a Java function. An XML data input 16 is received by the validation engine 14 which determines whether the XML data input 16 meets with a set of constraints defined by the metadata structure 12. The validation engine 14 then generates a validation result 18 as output, which may be "pass" if the input data 16 meets the constraints or "fail" if the constraints are not met.

Figure 2:
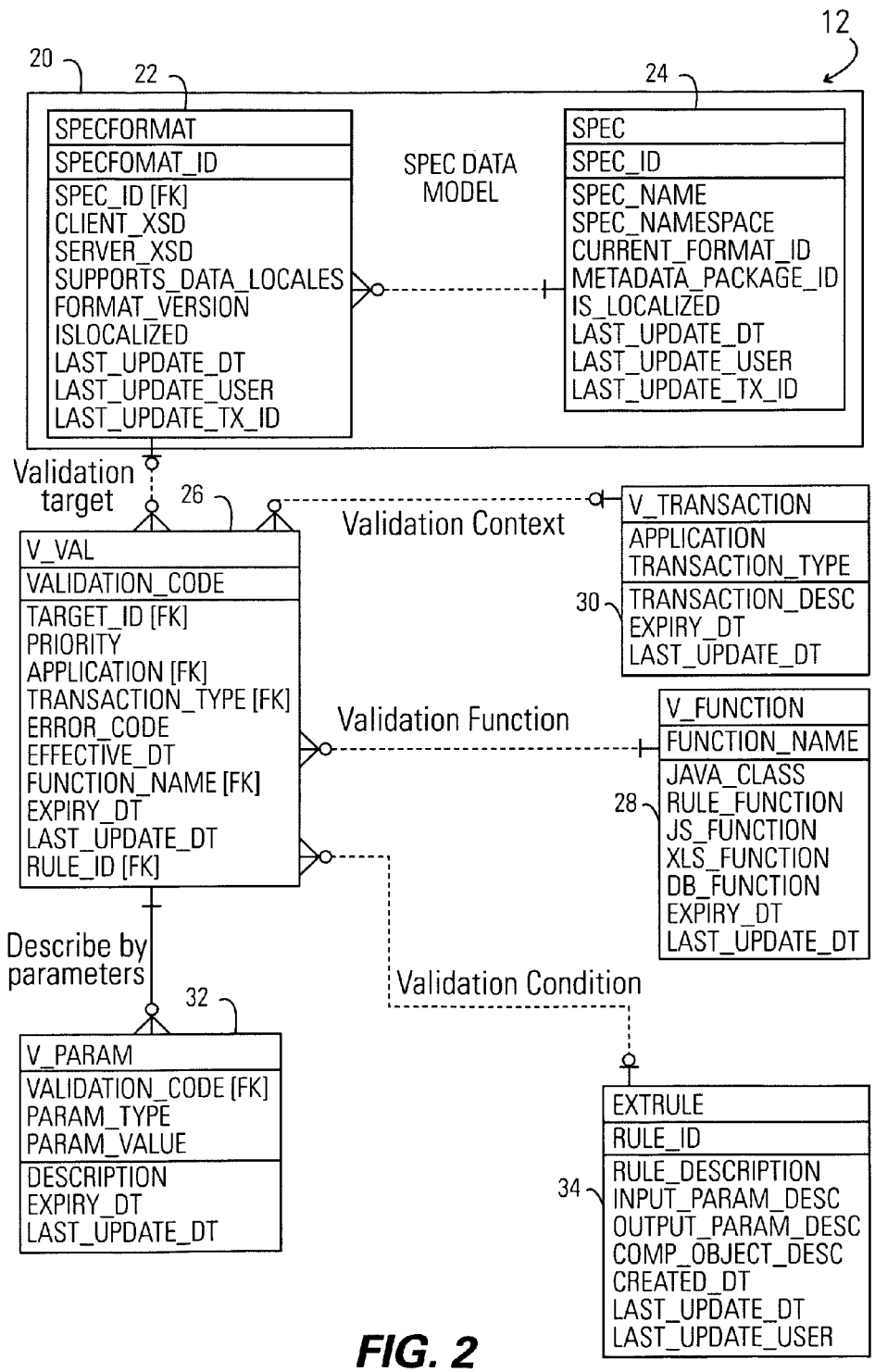
FIG. 2 shows a diagram of a variable data external validation data model in accordance with an embodiment of the present invention.

The present invention has two main components: 1) a metadata data model (metadata structure 12) to store the metadata for validation; and 2) a runtime memory model design to consume the metadata for validation execution. The metadata structure 12 in FIG. 1 is shown in more detail in FIG. 2. FIG. 2 shows a variable data external validation data model. The data model is variable, which means that the XML specification can be easily changed at runtime or at deployment time. This is in contrast to prior techniques such as the use of programming language to express additional constraints where the model is created and compiled and would be difficult to change at runtime. The data model is external, which means that instead of being part of a tightly coupled programming model, it is external and can be easily changed, even by users who are non-programmers.

The metadata structure 12 consists of four main database tables: V_VAL; V_PARAM; V_TRANSACTION; and V_FUNCTION. As shown in FIG. 2, an XML specification data model 20 includes two tables, a specformat table 22 and a spec table 24. These tables 22, 24 are used to store information about the XML data model. The specification data model 20 is linked to a target validation table 26 (V_VAL), which points to the specific XML schema to be validated in the specification data model 20.

A validation function table 28 points to a Java class to be executed. In this case, the Java class is a Java function. In one embodiment of the invention, the Java function to be executed is a Java class that extends a Java class known to those skilled in the art called the ValidatorCommon Java class. The ValidatorCommon Java class is shown in FIG. 3. The Java function is loaded and used by the validation engine 14.

A transaction table 30 specifies a transaction context for when the validation should be executed. A validation parameter table 32 drives how the validation function will be executed. An optional external rule table 34 may be evaluated against an external rule before executing a validation to decide if the validation should be executed.

Figure 4:
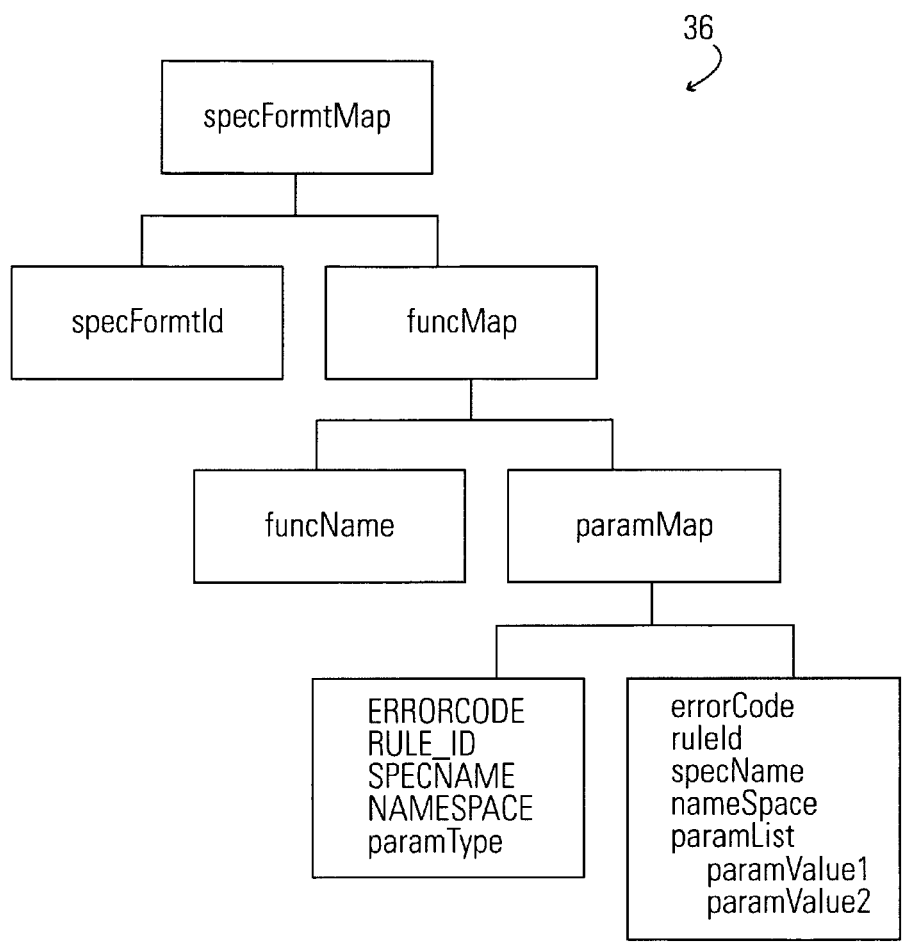
FIG. 4 shows a runtime memory model design to consume metadata for validation execution in accordance with an embodiment of present invention.

A runtime memory model 36 is shown in FIG. 4. The runtime memory model 36 defines how the metadata will be consumed during validation execution. The implementation, running on the validation engine 14 is instantiated based on validation context defined in the transaction table 30. The XML schema instances are sent to the validation engine 14 for validation. All validations defined in metadata that match the current transaction context will be executed and returned with a result.

FIG. 5 shows an exemplary XML schema which needs an element validation and a cross element validation. Both validations cannot be implemented by an XSD/DTD constraint. FIG. 5 shows the XSD schema for this example. The XML instance fragment for the schema shown in FIG. 5 is shown in FIG. 6. The Global Trade Identification Number (GTIN) element in FIG. 6 needs a validation check. The element validation on this GTIN element may then be performed.

In one embodiment, the GTIN validation definition is as shown in FIG. 7. Note that the parameter driven validation function com.ibm.mdm.validation.GTINCheck is reusable if more than one schema have the GTIN attribute. It is realized by specifying different PATH to GTIN element in the schema. FIG. 8 shows the related metadata table records for the above example.

Continuing with the above example we now assume that we need to perform a cross element validation on price. In this example the cross element validation is to check that the normal price is always greater than discount price. XSD/DTD schema cannot handle any cross element validation. In accordance with the present invention, a declarative approach is used to achieve this cross element validation. In particular, the price validation definition shown in FIG. 9 may be used. Note that the parameter driven validation function—com.ibm.mdm.validation.GreaterCheck—is reusable. It is realized by specifying different PATH for BIG and SMALL values. The related metadata table records are shown in FIG. 10.

The invention can take the form of an entirely hardware embodiment, an entirely software embodiment or an embodiment containing both hardware and software elements. In a preferred embodiment, the invention is implemented in software, which includes but is not limited to firmware, resident software and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a memory (semiconductor or solid state), magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
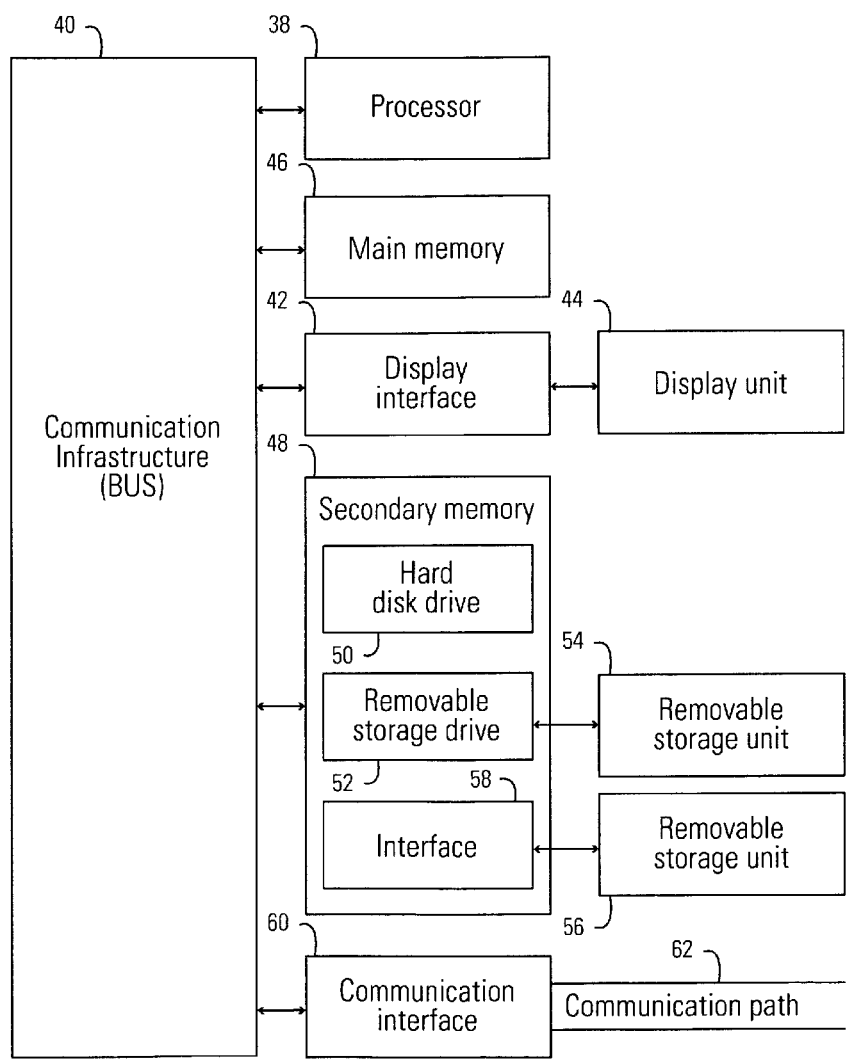
FIG. 11 shows a high level block diagram of an information processing system useful for implementing one embodiment of the present invention.

FIG. 11 is a high-level block diagram showing an information processing system useful for implementing one embodiment of the present invention. The computer system includes one or more processors, such as processor 38. The processor 38 is connected to a communication infrastructure 40 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 42 that forwards graphics, text, and other data from the communication infrastructure 40 (or from a frame buffer not shown) for display on a display unit 44. The computer system also includes a main memory 46, preferably random access memory (RAM), and may also include a secondary memory 48. The secondary memory 48 may include, for example, a hard disk drive 50 and/or a removable storage drive 52, representing, for example, one of a floppy disk drive, a magnetic tape drive or an optical disk drive. The removable storage drive 52 reads from and/or writes to a removable storage unit 54 in a manner well known to those having ordinary skill in the art. Removable storage unit 54 represents, for example, one of a floppy disk, a compact disc, magnetic tape or optical disk, which is read by and written to by removable storage drive 52. As will be appreciated, the removable storage unit 54 includes a computer readable medium having stored therein computer software and/or data.

In alternative embodiments, the secondary memory 48 may include other similar means for allowing computer programs or other instructions to be loaded into the computer system. Such means may include, for example, a removable storage unit 56 and an interface 58 which in turn may include a program cartridge and cartridge interface (such as that found in video game devices), a removable memory chip (such as an EPROM, or PROM) and associated socket, and other removable storage units 56 and interfaces 58 which allow software and data to be transferred from the removable storage unit 56 to the computer system.

The computer system may also include a communications interface 60. Communications interface 60 allows software and data to be transferred between the computer system and external devices. Examples of communications interface 60 may include a modem, a network interface (such as an Ethernet card), a communications port or a PCMCIA slot and card. Software and data transferred via communications interface 60 are in the form of signals which may be, for example, electronic, electromagnetic, optical, or other signals capable of being received by communications interface 60. These signals are provided to communications interface 60 via a communications path (i.e., channel) 62. This channel 62 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 46 and secondary memory 48, removable storage drive 52 and a hard disk installed in hard disk drive 50.

Computer programs (also called computer control logic) are stored in main memory 46 and/or secondary memory 48. Computer programs may also be received via communications interface 60. Such computer programs, when executed, enable the computer system to perform the features of the present invention as discussed herein. In particular, the computer programs, when executed, enable the processor 38 to perform the features of the computer system. Accordingly, such computer programs represent controllers of the computer system.

From the above description, it can be seen that the present invention provides a method for expressing XML schema validation using Java in a declarative manner. The present invention also overcomes limitations in the prior art in expressing complex constraints for XML schema. The present invention exploits the full programming power of Java with the flexibility of a declarative approach. While the embodiment above described the invention using particular examples, it will be appreciated that the above teachings may be readily adapted to many different kinds of XML data.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

I claim:

1. A method for processing information comprising:
defining a schema validation using metadata stored in a database, the metadata including constraints defined in a declarative manner, the constraints including at least one non-structural constraint, wherein the metadata comprises:
a target validation table that points to a XML schema to be validated;
a validation function table pointing to a Java class to be executed;
a transaction table that specifies a transaction context for when a validation function will be executed;
a validation parameter table that determines how the validation function will be executed; and
an external rule table;
building a memory model using said metadata;
receiving input data for validation in a validation engine;
evaluating a validation condition against an external rule contained in said external rule table;
based on the evaluation of the validation condition against the external rule, validating said input data by executing the Java class in said validation engine using said input data and said metadata, wherein the Java class is configured to perform cross element validation on said data input; and
generating an output from said validation engine that identifies said input data as being validated or not validated.

2. The method of claim 1 wherein said Java class includes a Java function which extends a ValidatorCommon Java class.

3. The method of claim 1 further comprising modifying said schema validation by modifying said metadata.

4. The method of claim 3 wherein said modifying is conducted at runtime.

5. The method of claim 1 wherein said Java class comprises a Java function and further comprising using said Java function for more than one XML schema.

6. A method for validating a XML schema comprising:
expressing a set of complex constraints as declarative metadata, the complex constraints including at least one non-structural constraint;
storing said declarative metadata in database tables, wherein the declarative metadata comprises:
a target validation table that points to a XML schema to be validated;
a validation function table pointing to a Java class to be executed;
a transaction table that specifies a transaction context for when a validation function will be executed;
a validation parameter table that determines how the validation function will be executed; and
an external rule table;
creating a runtime memory model using said declarative metadata; and
evaluating a validation condition against an external rule contained in said external rule table;
based on the evaluation of the validation condition against the external rule, validating said XML schema using said declarative metadata in a Java validation engine by executing the Java class in said validation engine, wherein the Java class is configured to perform cross element validation on said data input.

7. The method of claim 6 wherein validating comprises validating said declarative metadata according to said runtime memory model.

8. The method of claim 6 further comprising generating an output from said Java validation engine that identifies said input data as being validated or not validated.

9. A system for performing schema validation, the system comprising a processor configured to perform a method, the method comprising:
- defining a schema validation using metadata stored in a database, the metadata including constraints defined in a declarative manner, the constraints including at least one non-structural constraint, wherein the metadata comprises:
  - a target validation table that points to a XML schema to be validated;
  - a validation function table pointing to a Java class to be executed;
  - a transaction table that specifies a transaction context for when a validation function will be executed;
  - a validation parameter table that determines how the validation function will be executed; and
- an external rule table;
- building a memory model using said metadata;
- receiving input data for validation in a validation engine;
- evaluating a validation condition against an external rule contained in said external rule table;
- based on the evaluation of the validation condition against the external rule, validate said input data by executing the Java class in said validation engine using said input data and said metadata, wherein the Java class is configured to perform cross element validation on said data input; and
- generating an output from said validation engine that identifies said input data as being validated or not validated.

10. The system of claim 9 further comprising a memory model constructed using said metadata.

11. A computer program product comprising a non-transitory computer usable medium having a computer readable program, wherein said computer readable program when executed on a computer causes said computer to:
- define a schema validation using metadata stored in a database, the metadata including constraints defined in a declarative manner, the constraints including at least one non-structural constraint, wherein the metadata comprises:
  - a target validation table that points to a XML schema to be validated;
  - a validation function table pointing to a Java class to be executed;
  - a transaction table that specifies a transaction context for when a validation function will be executed;
  - a validation parameter table that determines how the validation function will be executed; and
- an external rule table;
  - build a memory model using said metadata;
  - receive input data for validation in a validation engine;
  - evaluate a validation condition against an external rule contained in said external rule table;
  - based on the evaluation of the validation condition against the external rule, validate said input data by executing the Java class in said validation engine using said input data and said metadata, wherein the Java class is configured to perform cross element validation on said data input; and
  - generate an output from said validation engine that identifies said input data as being validated or not validated,
- wherein said metadata further includes a validation table and further comprising using said validation table to point to a particular XML schema to be validated.

12. The computer program product of claim 11 wherein the constraints further include a set of complex constraints.

* * * * *